United States Patent
Kitchener et al.

(10) Patent No.: US 9,127,659 B2
(45) Date of Patent: Sep. 8, 2015

(54) MULTISTAGE COMPRESSORS FOR PET BOTTLE BLOWING PROCESSES

(75) Inventors: Anthony John Kitchener, Victoria (AU); Didier Rolin, Liege (BE)

(73) Assignee: Ateliers Francois, Liege (BE)

( * ) Notice: Subject to any disclaimer, the term of this patent is extended or adjusted under 35 U.S.C. 154(b) by 0 days.

(21) Appl. No.: 13/817,494

(22) PCT Filed: Aug. 17, 2011

(86) PCT No.: PCT/AU2011/001047
§ 371 (c)(1),
(2), (4) Date: Feb. 18, 2013

(87) PCT Pub. No.: WO2012/021928
PCT Pub. Date: Feb. 23, 2012

(65) Prior Publication Data
US 2013/0149173 A1 Jun. 13, 2013

(30) Foreign Application Priority Data
Aug. 17, 2010 (AU) ............................... 2010903684

(51) Int. Cl.
| | |
|---|---|
| *F04B 25/00* | (2006.01) |
| *F04B 49/06* | (2006.01) |
| *F04B 49/24* | (2006.01) |
| *B29C 49/42* | (2006.01) |
| *F04B 41/06* | (2006.01) |
| *F04B 49/03* | (2006.01) |
| *F04B 49/08* | (2006.01) |
| *B29C 49/06* | (2006.01) |
| *B29K 67/00* | (2006.01) |

(52) U.S. Cl.
CPC ................. *F04B 25/00* (2013.01); *B29C 49/42* (2013.01); *F04B 41/06* (2013.01); *F04B 49/03* (2013.01); *F04B 49/065* (2013.01); *F04B 49/08* (2013.01); *F04B 49/243* (2013.01); *B29C 49/06* (2013.01); *B29K 2067/003* (2013.01)

(58) Field of Classification Search
CPC ...... F04B 25/00; F04B 49/065; F04B 49/225; F04B 49/24; F04B 49/243; F04B 2205/05; F04B 41/06; F04B 49/03; F04B 49/08; B29K 2067/003
USPC .................. 417/213, 397, 536, 266, 254, 298
See application file for complete search history.

(56) References Cited

U.S. PATENT DOCUMENTS

| | | | | |
|---|---|---|---|---|
| 1,614,138 | A | | 1/1927 | Longacre |
| 1,671,984 | A | * | 6/1928 | Goodman ...................... 417/252 |
| 2,155,236 | A | * | 4/1939 | Newell ............................. 251/58 |
| 2,431,769 | A | * | 12/1947 | Parker ............................ 137/469 |

(Continued)

OTHER PUBLICATIONS

International Search Report for PCT Application No. PCT/AU2011/001047 dated Nov. 25, 2011.

*Primary Examiner* — Devon Kramer
*Assistant Examiner* — Joseph Herrmann
(74) *Attorney, Agent, or Firm* — Norris McLaughlin & Marcus, P.A.

(57) ABSTRACT

A multistage reciprocating air compressor compresses air to an elevated pressure level discharge with an intermediate pressure level discharge for use in blow molding of PET bottles and similar products. The air compressor has a first, second and third reciprocating piston stages with first, second and third actuators operable in response to respective sensed discharge pressure levels from the discharges to actuate inlet unloading elements.

8 Claims, 1 Drawing Sheet

(56) References Cited

U.S. PATENT DOCUMENTS

| | | |
|---|---|---|
| 2,432,553 A | 12/1947 | Zilly |
| 3,074,619 A | 1/1963 | Larsson et al. |
| 4,432,698 A * | 2/1984 | Shirakuma et al. ............. 417/27 |
| 4,761,118 A * | 8/1988 | Zanarini ....................... 417/254 |
| 5,244,357 A * | 9/1993 | Bauer ........................... 417/298 |
| 6,206,652 B1 * | 3/2001 | Caillat .......................... 417/298 |
| 6,607,366 B2 * | 8/2003 | Sperry .......................... 417/306 |
| 6,652,240 B2 * | 11/2003 | Wichert .......................... 417/53 |
| 7,118,348 B2 * | 10/2006 | Dean et al. ...................... 417/12 |
| 2002/0141884 A1 | 10/2002 | Sperry |
| 2008/0319571 A1 * | 12/2008 | Voth et al. ..................... 700/197 |

\* cited by examiner

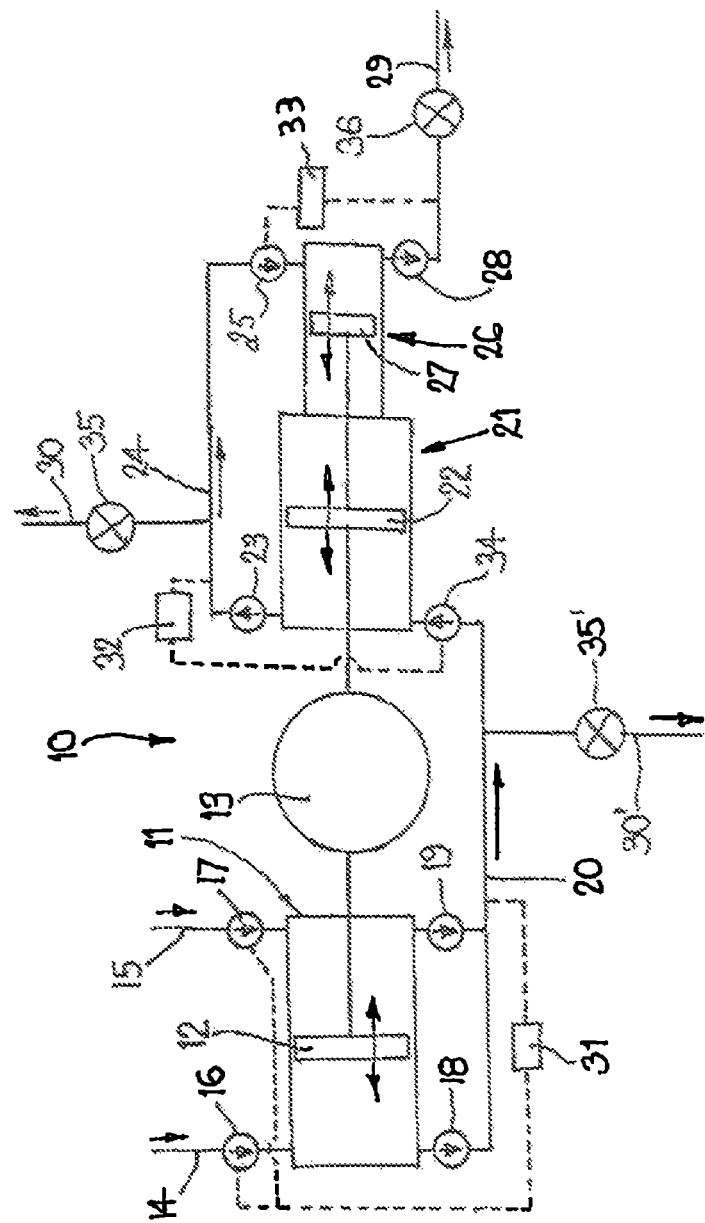

MULTISTAGE COMPRESSORS FOR PET BOTTLE BLOWING PROCESSES

This is a 371 of PCT/AU2011/001047 filed 17 Aug. 2011 (international filing date), and claims the priority of Australian Application No. 2010903684, filed 17 Aug. 2010.

FIELD OF THE INVENTION

The present invention relates to improvements in the field of compressors used for blow moulding of PET (or similar) bottles or similar products.

BACKGROUND OF THE INVENTION

Air compressors are widely used for the compression of air for use in blow moulding processes for forming PET bottles or the like. In the flowing, reference will be made to blow moulding of PET (polyethylene terephthalate) products, however, it should be understood the invention also relates to blow moulding of products from other materials similar to PET. In most manufacturing facilities, compressed air is required at different and sometimes variable, pressure levels. Low compressed air (eg 6 to 10 bars) may be needed for pre-form inflation, factory automation and other general service compressed air requirements, and high pressure compressed air (eg 30 to 40 bars) may be required for bottle blowing to a completed standard. Commonly it is the current practice to use separate compressors to achieve the foregoing requirements, ie a dedicated low pressure compressor and a dedicated high pressure compressor. In some installations, low pressure air can be supplied from a single high pressure compressor via a pressure reducing valve. Use of two machines complicates installation and maintenance and supply of low pressure compressed air via a pressure reducing valve from a high pressure compressor involves significant energy losses. Thus, either of these alternatives has its disadvantages.

A further complication is that compressed air usage in blow moulding installations varies considerably depending on the number of bottles being blown per hour and the size of the bottles being blown. Furthermore, in this industry there are strong seasonal demands in the numbers of blown bottles required to be produced.

One option is to take a supply of low pressure compressed air from an intermediate stage of a multistage compressor. For example, if the low pressure compressed air desired is 10 bars, it may be extracted from the second stage of a three stage machine which typically might be at 12 bars. A pressure reducing valve may be required to regulate the pressure back to 10 bars and although there is an energy loss through this pressure reducing valve, the loss is much smaller than reducing the pressure to 10 bars from higher pressure such as at 40 bars.

Another possible option might be if the speed of the compressor could be adjusted by means of a variable speed drive (VSD) from say 100% capacity to 20% capacity. If this were possible, it might provide a reasonable solution, however, the application of VSD to piston compressors is difficult due to balance, lubrication and valve requirements. Typically, such piston compressors should not be slowed down to less than 70 to 80% of their full load speed. Furthermore, VSD systems tend to be expensive and may be unreliable. As a result, it is believed desirable to run piston compressors at a fixed speed.

If the first stage of a multistage piston compressor is unloaded partially (so called step unloading, whereby one side of a double acting compressor cylinder is unloaded), the interstage pressures of each subsequent stage (from where the extracted air might be taken) falls. This causes problems when either the compression ratio in the final stage exceeds a safe limit, or the interstage pressure is lower than the desired pressure.

There is a need therefore to be able to provide compressed air at two desired pressure levels from a single compressor, conveniently, a multistage piston compressor.

SUMMARY OF THE INVENTION

In accordance with one aspect of the invention, a multistage reciprocating piston air compressor is provided for compressing atmospheric air to an elevated pressure level, said air compressor having a multistage reciprocating piston air compressor for compressing atmospheric pressure air to an elevated pressure level, said air compressor having a first, second and third reciprocating piston stages, said first stage including a first inlet unloading means, said second stage including a second inlet unloading means and said third stage including a third inlet unloading means, a first actuating means operable in response to a sensed discharge pressure level from a discharge of said first stage to actuate said first inlet unloading means, a second actuation means operable in response to a sensed discharge pressure level from a discharge of said second stage, to actuate said second inlet unloading means, and a third actuating means operable in response to a sensed discharge pressure level from said third stage to actuate said third inlet unloading means, said multistage reciprocating air compressor having a first pressurised air discharge at said elevated pressure level from said third stage and an intermediate pressure level discharge from an interstage region between at least one of said first and second stages or said second and third stages.

Conveniently, the first stage comprises a double acting reciprocating piston compressor stage. Each of the second and third stages may comprise a single acting reciprocating piston compressor stage. In a particularly preferred embodiment, the air compressor is used to deliver low and high pressure air to a PET bottle blow moulding apparatus for use in forming PET bottles or similar PET containers.

Preferably each of said first, second and third unloading means is cycled for on and off periods with the on period being relatively short compared to the off period. Conveniently the on period is defined by a number of cycles of the reciprocating piston stage affected by the unloading means. Conveniently air pressure in the interstage regions is maintained substantially constant.

BRIEF DESCRIPTION OF THE DRAWING

A preferred embodiment will hereafter be described with reference to the drawing (FIG. 1) annexed hereto showing schematically an air compressor 20 according to the present invention.

DESCRIPTION OF THE PREFERRED EMBODIMENT

FIG. 1 shows schematically a multistage reciprocating piston air compressor 10 according to one preferred embodiment of the present invention. The air compressor 10 includes a first stage 11 with a double acting piston 12 driven by a drive means 13 of any suitable type. The piston 12 compresses air both on a forward and reverse stroke and therefore includes a pair of atmospheric air inlet means 14, 15 each controlled by first unloading valve means. Air compressed by the first stage 11 is delivered via discharge valves 18, 19, which include a non-return function, a first interstage connection region 20, and a second unloading inlet valve means 34, to a second stage 21 comprised of a single acting reciprocating piston 22. Air compressed by the second stage 21 is delivered via a discharge valve 23 with a non-return function, a second interstage connection region 24, and a third inlet unloading valve means 25 to a third stage 26. The third stage 26 also includes a single acting reciprocating piston 27 delivering compressed air at a desired elevated pressure level via a discharge valve 28 with a non-return function and a control valve 36 to an elevated pressure discharge line 29. An intermediate pressure air discharge lines 30 and 30' may selectably deliver lower pressure compressed air from the second interstage connection region 24 (or possibly the first interstage connection region 20) via a control valve 35, 35'. While the second and third stages, 21, 26 may be driven by the same drive means 13 as the first stage 11, independent drive means might also be employed.

Operation of each of the first inlet unloading valve means can operate individually or jointly in response to pressure sensed in the first inlet stage connection region 20 between the first and second stages 11, 21. A control means 31 which may include a pressure switch or sensor commands a solenoid to operate the first inlet unloading valve means when the pressure rises in the first interstage region 20 above a set level. A control means 32 sensing pressure in the second interstage connection region 24 might also be utilized commanding a solenoid to operate the first inlet unloading valve means when the pressure rises in region 24 above a set level. The second and third inlet unloading valve means may operate similarly in response to pressure being sensed by control means 32, 33 to rise above a preset level in the second interstage connection region 24 or the discharge line 29 from the third stage 26.

In the preferred compressor according to the present invention it is proposed that the inlet valves of each stage may be unloaded for a short period proportion to the desired reduction of the compressor capacity so as to keep the interstage pressure constant despite variations in final delivered air consumption and variations in the extracted air amount from the interstage.

Inlet unloading of compressors operate by mechanically holding open the inlet valve 16, 17, 34, 25 of a compressor stage 11, 21, 26 so the compressor 10 firstly induces air through the inlet valve as the piston retracts but as the compressor cylinder returns and the machine begins to compress no compression can occur because the inlet valve is open and the induced air is discharge back though the inlet valve.

In typical compressor practice this cycling occurs at intervals of 15 to 120 seconds. At nearly full load the compressor pumps mostly and idles slightly. At low load the cylinder idles most of the time.

In the present invention, it is proposed to use this unloading mechanism but to considerably reduce the time for regulation to a number of cycles (so the unload time may be as short as 0.5 or 4 strokes of the cylinder on a 500 rpm compressor).

By lowering this unload time sufficiently the interstage volumes (consisting of the cylinder chests, coolers, piping and separators) have enough volume that the pressure of the interstage does not vary substantially between unload cycles even though one stage may be pumping and the subsequent stage is unloaded.

When the unloading system is configured in this manner then judicious regulation of the unloading of each stage allows any combination of total flow and interstage extraction.

In the preferred embodiment illustrated in FIG. 1 each stage is controlled by the discharge pressure of the subsequent stage. So the inlet valve unloaders of the first stage are regulated by the pressure existing in the interstage volume between the second and first stages. A pressure switch or sensor commands a solenoid to operate the first stage unloaders when the pressure rises above a preset level. Similarly the second stage is controlled by the interstage between the second and third and the third stage by the discharge after the third and final stage.

If high pressure demand falls the third stage unloads, then the second, then the first in a cascade. Similarly if high pressure demand increases the final stage will begin to pump and the lowering of the interstage pressures at the suction to the third stage (and discharge of the second) will cause the second to pump, and then the first because the pumping of the second stage lowers the pressure at the discharge of the first.

If more air is extracted from the second stage discharge for low pressure 30 uses (but there is no increased demand for high pressure air), only the second and first stage will pump.

If there is little overall demand for air the pressure rise will cascade back to the first stage and the total volume admitted to the system will reduce. Various modifications of the disclosed invention will be apparent to those skilled in this art.

The invention claimed is:

1. A multistage reciprocating piston air compressor for compressing atmospheric pressure air to an elevated pressure level, the air compressor comprising:
   a first reciprocating piston stage comprising a first cylinder, a second reciprocating piston stage comprising a second cylinder, and a third reciprocating piston stage comprising a third cylinder, wherein
     the first reciprocating piston stage comprises:
       at least one first atmospheric air inlet;
       at least one first inlet valve operable to control air flow from the at least one first atmospheric air inlet to the first cylinder; and
       at least one first discharge valve from the first cylinder,
     the second reciprocating piston stage comprises:
       a second inlet valve operable to control air flow from the at least one first discharge valve to the second cylinder; and
       a second discharge valve from the second cylinder, and
     the third reciprocating piston stage comprising:
       a third inlet valve operable to control air flow from the second discharge valve to the third cylinder; and
       a third discharge valve from the third cylinder;
   a first solenoid operable in response to a sensed discharge pressure level from a discharge of the first reciprocating piston stage to mechanically hold open the at least one first inlet valve of the first reciprocating piston stage;
   a second solenoid operable in response to a sensed discharge pressure level from a discharge of the second reciprocating piston stage to mechanically hold open the second inlet valve of the second reciprocating piston stage;
   a third solenoid operable in response to a sensed discharge pressure level from the third reciprocating piston stage to mechanically hold open the third inlet valve of the third reciprocating piston stage;
   a first pressurized air discharge at the elevated pressure level from the third reciprocating piston stage; and
   at least one selected from (i) a first intermediate pressure air discharge line configured to selectably extract first lower pressure compressed air from a first interstage region between the first and second reciprocating piston stages for first lower pressure uses and (ii) a second intermediate pressure air discharge line configured to selectably extract second lower pressure compressed air from a second interstage region between the second and third reciprocating piston stages for second lower pressure uses.

2. The multistage reciprocating piston air compressor according to claim 1, wherein the first reciprocating piston stage is a double acting reciprocating piston compressor stage.

3. The multistage reciprocating piston air compressor according to claim 2, wherein each of the second and third reciprocating piston stages is a single acting reciprocating piston compressor stage.

4. The multistage reciprocating piston air compressor according to claim 1, wherein
the at least one first inlet valve is mechanically held open by the first solenoid for a first period of time,
the second inlet valve is mechanically held open by the second solenoid for a second period of time,
the third inlet valve is mechanically held open by the third solenoid for a third period of time,
the at least one first inlet valve is not held open by the first solenoid for a fourth period of time,
the second inlet valve is not held open by the second solenoid for a fifth period of time, and
the third inlet valve is not held open by the third solenoid for a sixth period of time, and
further wherein the first period of time is less than the fourth period of time, the second period of time is less than the fifth period of time, and the third period of time is less than the sixth period of time.

5. The multistage reciprocating piston air compressor according to claim 4, wherein the first, second and third periods of time, during which the at least one of the first, second and third inlet valves are mechanically held open, is defined by a number of cycles of the first, second and third reciprocating piston stages, respectively.

6. The multistage reciprocating piston air compressor according to claim 4, wherein air pressure in each of the first and second interstage regions is maintained substantially constant.

7. The multistage reciprocating piston air compressor according to claim 1, wherein each of the at least one first inlet valve, the at least one first discharge valve, the second inlet valve, the second discharge valve, the third inlet valve and the third discharge valve is a one-way valve.

8. A PET bottle moulding machine including the multistage reciprocating piston air compressor according to claim 1.

* * * * *